United States Patent Office 3,103,085
Patented Sept. 10, 1963

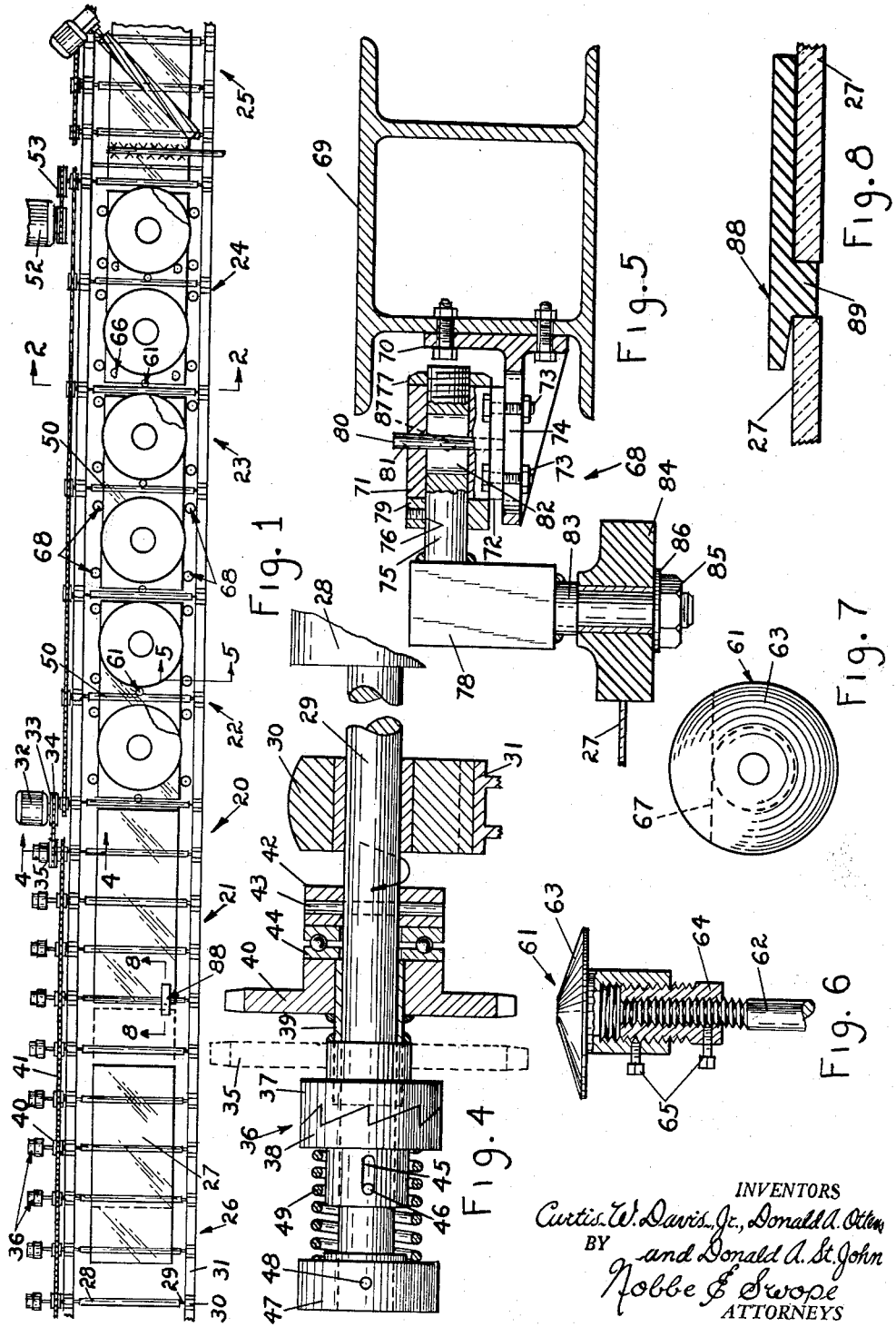

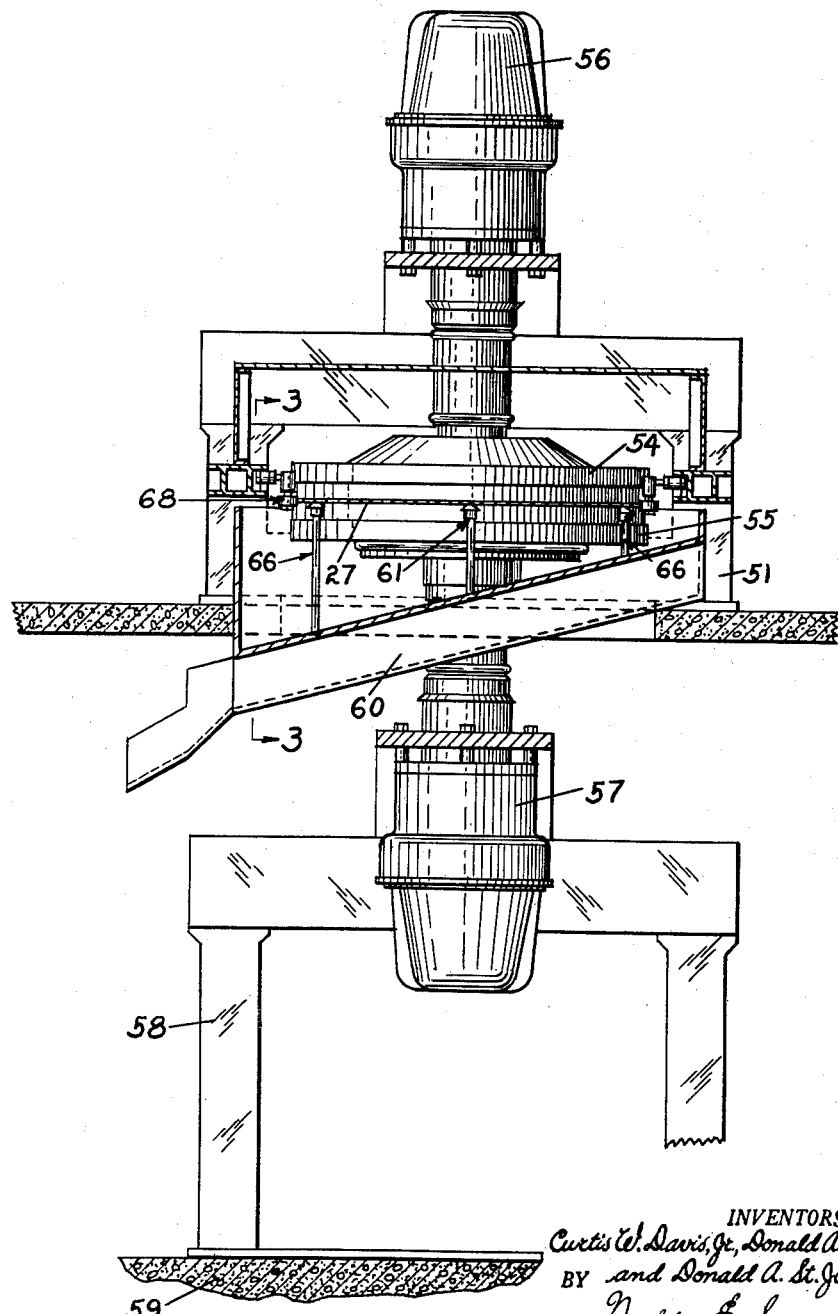

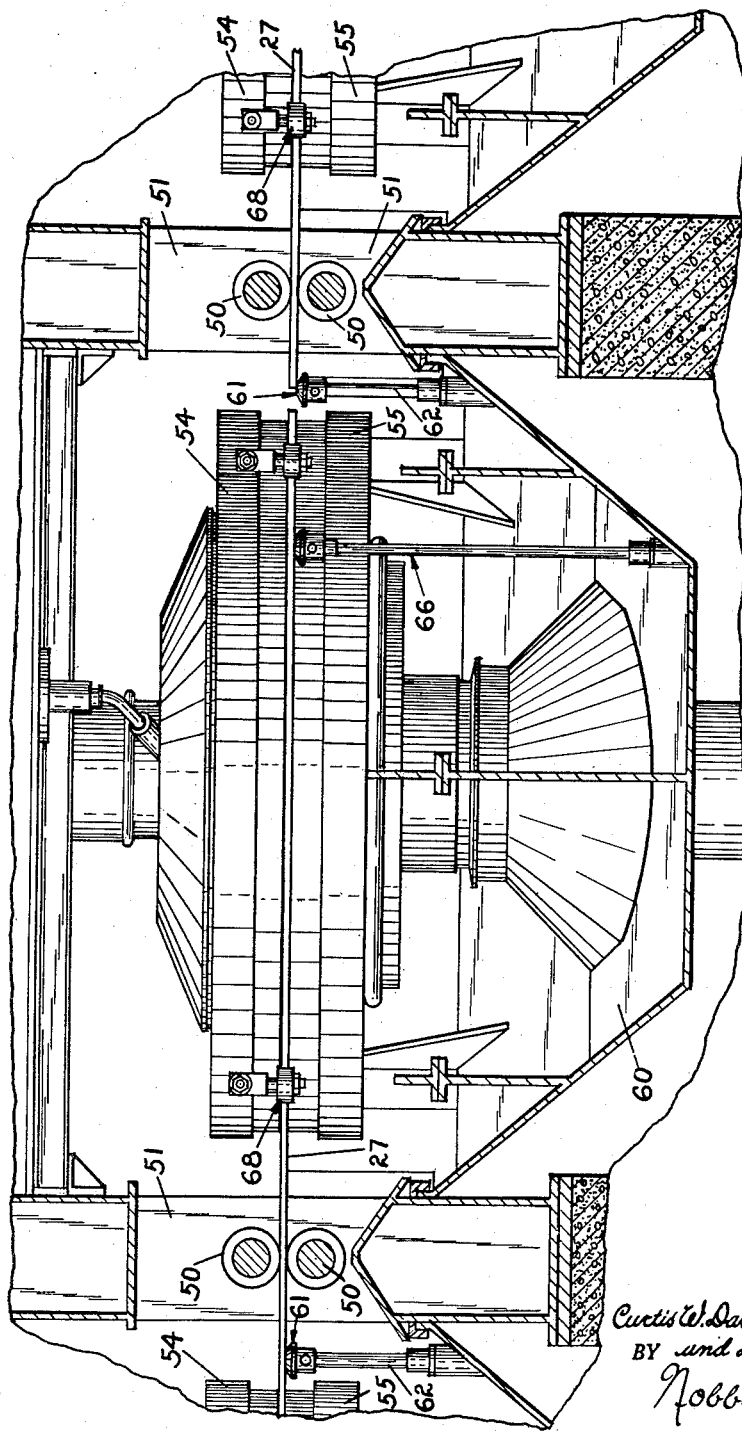

3,103,085
METHOD AND APPARATUS FOR
SURFACING GLASS
Curtis W. Davis, Jr., Toledo, Donald A. Ottens, Perrysburg, and Donald A. St. John, Toledo, Ohio, assignors to Libbey-Owens-Ford Glass Company, Toledo, Ohio, a corporation of Ohio
Continuation of application Ser. No. 812,243, May 11, 1959, which is a continuation of application Ser. No. 597,409, July 12, 1956. This application May 7, 1962, Ser. No. 198,390
30 Claims. (Cl. 51—112)

The present invention relates broadly to an improved method and apparatus for surfacing flat glass and more particularly to a novel method and apparatus for simultaneously surfacing the opposed surfaces of glass where the glass is in the form of a continuous ribbon or in the form of a plurality of individual cut blank sheets.

This application is a continuation of copending application Serial No. 812,243, filed May 11, 1959, now abandoned, which in turn is a continuation of application Serial No. 597,409, filed July 12, 1956, and now abandoned.

The advent of machines for simultaneously surfacing both sides of a continuous ribbon of glass, as it issues from an annealing lehr, has greatly increased production, reduced production costs and improved the quality of the surfaced glass. This machine, commonly referred to as a twin grinding machine, although specifically designed to surface only a continuous ribbon, represented an important advance in the art of grinding glass.

This twin grinding equipment is expensive and represents a considerable investment. Its installation requires permanent positioning with respect to the tank furnace so that it is directly employed to receive and surface glass emitting from a specific tank furnace. In the operation of a twin grinding line, glass flows from the tank furnace, is reduced to sheet form, and passes between the individual tools of the twin grinding apparatus, which apparatus simultaneously surfaces both sides of the glass ribbon. However, when it becomes necessary to repair either the furnace or the lehr, the production of ground glass by the twin grinding equipment would naturally be terminated. Consequently, this expensive surfacing equipment is idled and the resultant total of ground glass produced is severely curtailed. This naturally follows because with either the furnace or the lehr out of operation there would not be any glass delivered to the twin grinding machines. These machines are not portable, as above noted, being fixedly positioned in line with a glass melting furnace, and therefore there is no way of supplying a glass ribbon to the twin grinding line when its particular glass furnace is not operating.

This is of great significance since such a waste of productive potential naturally incurs a correspondingly heavy financial loss as well as a reduction of glass output. It is therefore apparent that the idling of this expensive and highly productive equipment is not just a simple problem of, for example, schedule changes. This is particularly critical due to the ever increasing demands for plate glass, i.e. that glass which has ground and polished surfaces. All the time required for furnace and lehr maintenance undesirably curtails the total production of the twin grinding apparatus and this "down time" has become highly objectionable. However, it is also true that both the furnace and the lehr have to shut down periodically for overhaul or maintenance so that heretofore during certain periods the twin grinding equipment was forced to cease operation.

The prior art, while showing many improvements upon the basic idea of grinding both sides of a continuous ribbon, offers no solution to the perplexing problem of how a twin grinding line can be effectively utilized to surface individual cut blank sheets when there is no continuous ribbon of glass upon which the equipment can operate. In this regard, it is particularly emphasized that patents heretofore issued relating to twin grinding equipment are exclusively directed to the solution of the problems associated with that equipment as it performs its normal function of surfacing a continuous ribbon.

Therefore, it is a primary object of the present invention to provide a method and apparatus for simultaneously surfacing both sides of flat glass whether or not the glass be in the form of a continuous ribbon or in the form of individual cut blank sheets.

Another object of the invention is to provide a method of converting twin grinding apparatus in such a way that it can be effectively utilized to surface both sides of cut blank sheets thereby minimizing the down-time of the conventional twin grinding apparatus.

Another object of the invention is to provide an apparatus for carrying out the above method which is of relatively simple construction, effective in operation and inexpensive to maintain.

A still further object of the invention is to provide means for converting a twin grinding apparatus capable of surfacing only a continuous glass ribbon to one which is capable of surfacing individual cut blank sheets and which need not be reconverted for the surfacing of a continuous ribbon but which is thereafter capable of surfacing either glass in continuous ribbon form or glass in the form of individual cut blank sheets.

Other objects and advantages of the invention will become more apparent during the course of the following description when taken in connection with the accompanying drawings.

In the drawings wherein like numerals are employed to designate like parts throughout the same:

FIG. 1 is a schematic plan view of the surfacing apparatus;

FIG. 2 is a transverse sectional elevation of the surfacing apparatus, taken on the line 2—2 of FIG. 1;

FIG. 3 is a side elevation of the apparatus, taken on the line 3—3 of FIG. 2.

FIG. 4 is an enlarged section showing an over-running clutch forming a part of the conveyor of the apparatus taken on the line 4—4 of FIG. 1;

FIG. 5 is an enlarged transverse section, taken on the line 5—5 of FIG. 1, showing the rolls for holding the blanks centered on the conveyor;

FIG. 6 is a detailed view, partly in section, of a support for the glass blanks;

FIG. 7 is a plan view of the supports of FIG. 6; and

FIG. 8 is an enlarged sectional view of a glass blank spacing device, taken on the line 8—8 of FIG. 1.

Referring now to the drawings and in particular to FIGS. 1 through 3, the numeral 20 designates the surfacing machine in general which is comprised of a loading section 21, a rough surfacing section 22, intermediate surfacing section 23, finish surfacing section 24 and a cleaning section 25. A conveyor 26, comprised of rolls which provide spaced lines of transverse support for the sheets, extends to the surfacing sections 22, 23 and 24 from the glass melting furnace not shown.

Heretofore, when the melting furnace or annealing lehrs were were being repaired, it was necessary to shut down the surfacing apparatus since it was not possible to surface individual cut blank sheets from another melting tank because chipping and/or breakage effects were caused when the edges of the individual sheets were passed between opposed surfacing runners in the surfacing sections. Now, however, according to the present invention, cut glass blanks may be readily surfaced without breaking or chipping.

As a matter of fact, during a recent shut down of the furnace used to supply continuous ribbon or sheet of glass to a surfacing machine 20 of the type indicated above, utilizing the concepts to be described hereinbelow, over 5,000,000 feet of cut glass blanks which ordinarily could not have been processed by the surfacing apparatus were surfaced over a six week period. In addition to the tremendous amount of glass processed by this apparatus, other equipment such as smooth polishing equipment was not idled nor were wareroom facilities which, under conventional conditions in the past, were required to shut down.

With reference again to the drawings, as shown in FIG. 1, cut glass blanks 27 are loaded on rubber covered rolls 28 of the conveyor 26 in the loading area 21. The rolls 28 are provided with shafts 29 supported in bearings 30 mounted on a conveyor frame 31 and are powered by an electric motor 32 through sprocket 33, chain 34 and sprocket 35. The sprocket 35 is shown in dotted lines in FIG. 4 because it is used only on the roll 28 that is driven directly from the motor 32.

As may be seen in FIG. 4, one end of each of the shafts 29 of rolls 28 is equipped with an over-running jaw clutch 36 which is comprised of a driver portion 37 and a driven portion 38. The driver portion 37 is mounted for free rotation by a sleeve 39 on the portion of the shaft 29 which projects through the bearing 30.

Also secured to the sleeve 39 is a sprocket 40 which is connected by a chain 41 (FIG. 1) to similar sprockets connected to the other rolls 28. To restrain movement of driver 37, sleeve 39, and sprocket 40 toward the bearing 30, there is provided a collar 42 fastened to shaft 29 by a pin 43. A bearing 44 is interposed between the sprocket 40 and the collar 42 to enable the sprocket and sleeve 39 to move freely relative to the collar and the shaft 29.

The driven portion 38 of the clutch is provided with a longitudinally extending slot 45 in the hub thereof through which a pin 46 carried by the shaft 29 extends. The shaft 29 extends completely through the clutch coupling 36 and terminates in a second collar 47 fastened to the extreme end of the shaft by a pin 48 to form a seat for a spring 49 which bears against the end of the driven half jaw 38 of the clutch 36. Power is supplied to all of the rolls through the sprocket 35 which is mounted on the sleeve 39 of only one of the rolls and is driven by the motor 32.

This construction provides for a constant speed rotational drive to each of the rolls 28 from the motor 32 and also permits acceleration of any or all of the rolls 28 faster than the drive provided by the motor when sheets on the rolls are pushed manually, or otherwise faster than the drive speed. Thus, the cut blank sheets 27 may be placed on the rolls 28 and pushed toward the first surfacing section 22 at a faster rate than they would be carried by the conveyor itself as a result of the over-running clutch 36.

As the sheets move into the surfacing section 22, they pass between pairs of cushioned rolls 50 (FIG. 3), which are mounted for rotation on supports 51. The cushioned rolls 50 are powered by one or more electric motors 52 through sprocket and chain means 53 (FIG. 1), and act to move the sheets through the respective surfacing sections. If desired, the rolls 50 can be driven by conventional line shaft and gear drives.

The apparatus for simultaneously surfacing both sides of the glass in each of the sections 22, 23 and 24 consists of upper and lower runners 54 and 55 (FIG. 3) spaced above and below the level of the glass blanks 27 with their faces parallel to each other. Conventional means are provided for applying a surfacing compound to the faces of the runners and to adjust the clearance between the runners and the glass, in a manner which is well known in the art. Each of the upper runners is rotated by a motor 56 (FIG. 2) and the lower runners by a similar motor 57. The upper and lower runners rotate in opposed directions and adjacent runners on the same side of the glass also rotate in opposed directions.

The lower runners 55 and drive motors are supported by a framework 58 rising from a sub-floor 59 with the lower runners being in vertical alignment with their companion upper runners 54. A hopper trough 60 is inclined downwardly at a level below the runners in a position to catch and gravitationally eject the spent surfacing compound.

In all the surfacing sections 22, 23 and 24, there is provided a frustrum shaped support 61 (FIG. 3) carried by a rod 62 mounted in one way or another on the framework of the surfacing apparatus. In the preferred arrangement, the support 61 is positioned along the longitudinal centerline of the sheets to lift and guide the leading edge of each blank 27 along its sloping surface 63 (FIG. 6) and into alignment with the space between each pair of runners 54 and 55 after the edge of the blank has passed the rolls 50. A bushing 64 (FIG. 6 and 7) is threaded into the bottom of the support 61 and onto the top of the rod 62 to provide adjustment in elevation. Set screws 65 lock the support at the selected elevation.

In the finish surfacing section 24, at which point the clearance between the runners is reduced, additional supports 66 (FIGS. 1 and 3) are provided to lift and guide the leading corner edges of each blank 27 into the space between the vertically aligned top and bottom runners. The side supports 66 are identical with the center supports 61 with the exception that the area of the support toward the longitudinal centerline of the conveyor has been cut along the dotted line 67 shown in FIG. 7. This was found desirable to keep the surfacing compound which is sprayed from the runners from being deflected upwardly in an objectionable manner by the sloping surface 63 of the supports. Of course, the additional supports 66 may also be used in all of the surfacing sections if it is advantageous to do so.

In spite of the contra-directional rotation of each pair of top and bottom runners 54 and 55 respectively, and of adjacent runners, both above and below the glass blanks, side thrust on the blanks as they pass between each pair of runners tends to cause the blanks to "fishtail" or deflect from straight line or rectilinear movement. To remedy this situation, roller assemblies 68 shown in detail in FIG. 5, are provided to extend inwardly from longitudinally positioned channel members 69 of the frame supports 51.

More particularly, the roller assemblies 68 comprise an angle bracket 70 extending inwardly from the channel 69. A bearing block 71 is fastened to a face 72 of the bracket 70 by bolts 73 which extend through a slot 74 in the bracket to provide lateral adjustment of the roller assembly.

A shaft 75 extends through a bore 76 in the block 71 and is threaded on the end adjacent the channel 69 to receive a nut 77. The other end of the shaft 75 is welded to a block 78 which extends downwardly at right angles thereto. A collar 79 with a set screw fits over the shaft 75, and a shear pin 80 extends through a cross hole 81 in the bearing block 71 and through a hole 82 in the shaft 75. The width of the hole 82 is substantially the same as the width of the shear pin 80 so as to prevent rotation of the shaft 75 while at the same time allowing it to be moved toward and away from the path of the sheet along the length of the slot. By positioning the collar 79 and nut 77 further lateral adjustment of the roller assembly 68 may be made.

A shouldered stub shaft 83 depends from the block 78 and is fixed thereto in any suitable manner. A wheel or roll 84 of a preferably non-metallic material is journaled for rotation on the reduced diameter of the shaft 83 and held there by a nut 85 and a washer 86. As shown in FIG. 5, the wheels 84 are positioned to engage the edges of the blanks 27 and may be adjusted to accommodate changes in the width of the sheets.

The shear pin 80 is provided so that in the event the glass should enter the area of one of the roller assemblies 68 out of normal alignment, the pin will shear when the roll is struck head on by the leading edge of the blank 27 and the wheel will thus be pivoted upwardly about the shaft 75. When running continuous ribbon or strip glass, the pin 80 may be withdrawn from hole 74 and the wheel 84 rotated 90° in a vertical direction about the axis shaft 75 to an inoperative position. The pin 80 is then inserted through a hole 87 in the bearing block 71 and through the slot 82 in the shaft 75 to maintain the wheel in an elevated position.

Now, when surfacing the cut blank sheets 27, it has been found desirable to space the sheets from one another as they pass through the surfacing sections 22, 23 and 24. Such spacing is necessary since it has been found that if the sheets abut one another, or are too close, that the wiggling or fishtailing effect imparted to the sheets by the runners 54 and 55 causes the edges of the sheets to work against one another resulting in chipping and breakage.

To accomplish the spacing of the sheets, after the first blank 27 has been placed on the conveyor 26 in the loading area 21, a spacer 88 (FIGS. 1 and 8) or rubber or other resilient material is placed on the trailing edge of the first sheet 27 with a leg portion 89 extending downwardly over the edge of the blank. Another blank 27 is then placed on the conveyor and advanced therealong by pushing the blank to accelerate each of the rolls 28 as they are engaged by the blanks until the edge of the manually accelerated blank engages the spacer 88. The spacer is then removed and positioned on the trailing edge of the last deposited blank. In most cases a spacing of about ½ inch or greater has been found to be very satisfactory and is maintained during the surfacing process as the blanks 27 are advanced between the runners 54 and 55.

In reviewing the operation of the invention, cut glass blanks 27 are placed on the conveyor 26 in the loading area 21. As the initial sheet is moved toward the first surfacing section 22 on the rolls 28, it is engaged by cushioned rolls 50 and moved toward the surfacing runners 54 and 55. After the leading edge of the blank moves away from the rolls 50 and toward the surfacing runners 54 and 55, it is supported by a support 61 and/or supports 66 so as to guide the blank into the space between the pair of surfacing runners. This continues as the leading edge of the sheet progresses through the remaining surfacing sections. For most cases it has been found desirable to have the upper supporting surface of the supports 61 and 66 from 10 to 75 thousandths of an inch below the true level of the glass, or in other words, below the surface of the lower runners 55. A setting that has been found to be very satisfactory is around 40 thousandths of an inch.

As a blank sheet enters the final surfacing section 24 where reduced clearance is provided between the runners, the additional supports 66 engage the sheet adjacent the edges thereof to enable the sheet to be more accurately directed between the respective runners. In each case, however, the supports 61 and/or 66 act to reduce the tendency for the edge portions of the sheet to deflect thereby causing the edge to strike the surfacing runners and producing chipping or breakage.

While being surfaced the sheets are maintained in spaced relationship with respect to one another so that the "fishtailing" or wiggling of the sheets caused by the torque exerted by the surfacing runners does not cause the edge portions of the sheets to work against one another again resulting in chipping or breakage. Spacing of the sheets is accomplished by using a guide spacer 88 between the sheets when they are placed on the loading conveyor 21 which is removed after the sheets have been aligned and spaced.

The spacing is then maintained by the cushioned rolls 50 which move the respective sheets at a uniform speed through the surfacing sections. The sheets are also kept in aligned relation with respect to one another as they pass through the surfacing sections by a plurality of rollers 84 which engage the side edges of the sheets during such travel.

In traveling along the surfacing apparatus, it will be of course evident that the length of the sheets should be generally at least as long as the center-to-center distance between successive drive rolls 50 so as to keep the sheets moving continuously.

It is to be understood of course that the form of the invention disclosed herein is to be taken as the preferred embodiment thereof, and that various changes in the shape, size and arrangement of parts may be resorted to without departing from the spirit of the invention.

We claim:

1. A method of simultaneously surfacing both sides of flat glass moving along a definite path, which includes moving the glass along said definite path toward and between a plurality of aligned pairs of spaced surfacing tools, one tool of each pair being positioned above the path of the glass and one tool of each pair being positioned below the path of the glass to define a space between the respective tools of each pair, supporting the glass in advance of each pair of tools by a point support located inwardly of the marginal edges thereof so as to lead the glass into the space between the tools of each pair in proper surfacing position whereby the glass will engage the working face of both tools of each pair, guiding the glass along the definite path in such a manner as to align the longitudinal center line of the glass, as it moves along the definite path, with a longitudinal line through the center of one surfacing tool of each aligned pair of tools and in such a manner as to maintain this alignment during the complete passage of the glass between all of the successive pairs of surfacing tools, and surfacing the glass as it passes through the space between the opposed tools in engagement with both of said tools.

2. A method of simultaneously surfacing both sides of flat glass moving along a definite path as defined in claim 1, including supporting the glass at a point located along its longitudinal center line prior to its entry into the space between said opposed surfacing tools.

3. A method of simultaneously surfacing both sides of flat glass moving along a definite path as defined in claim 1, including exerting pressure on at least one side edge of said glass to maintain the glass in alignment with said surfacing tools.

4. A method of simultaneously surfacing both sides of a plurality of individual cut blank sheets of glass moving along a definite path toward and between a plurality of aligned pairs of spaced surfacing tools, one tool of each pair being positioned above the path of the cut blank sheets and one tool of each pair being positioned below the path of the cut blank sheets to define a space between the respective tools of each pair, comprising supporting each individual cut blank sheet moving along said definite path to lead each cut blank sheet into alignment with the space between the individual tools of each pair, establishing a positive spacing between successive cut blank sheets to prevent each cut blank sheet from working against the adjacent edges of adjoining sheets under the action of the surfacing tools as they surface each cut blank sheet, and surfacing the glass as it passes through the space between the opposed tools in engagement with both of said tools.

5. A method of simultaneously surfacing both sides of a plurality of individual cut blank sheets of glass moving along a definite path toward and between a plurality of aligned pairs of spaced surfacing tools, one tool of each pair being positioned above the path of the cut blank sheets and one tool of each pair being positioned below the path of the cut blank sheets to define a space between the respective tools of each pair, comprising supporting each individual cut blank sheet to maintain the longitudinal center line of each cut blank sheet as it moves along said definite path in alignment with a longitudinal line through the center of at least one of the surfacing tools of each aligned pair of tools as each blank sheet moves through the space between the tools of each successive pair of tools, positively spacing the plurality of individual cut blank sheets from one another to prevent each cut blank sheet, under the action of the surfacing tools, from working against the adjacent edges of adjoining sheets as the tools surface each sheet passing between the successive pairs of tools, and surfacing the glass as it passes through the space between the opposed tools in engagement with both of said tools.

6. A method of simultaneously surfacing both sides of a plurality of individual cut blank sheets of glass as defined in claim 5, including inserting a spacer member between and in engagement with the opposed edges of each two adjacent cut blank sheets, and removing the spacer member before the sheets pass between the surfacing tools to achieve a definite spacing between the sheets.

7. An apparatus for simultaneously surfacing both sides of flat glass moving along a definite path, including means for moving glass along a definite path, a plurality of aligned pairs of spaced surfacing tools arranged along said path, one tool of each pair being positioned above the path of the glass and one tool of each pair being positioned below the path of the glass to define a space between the respective tools of each pair, point support means for engaging supporting the glass in advance of each pair of tools and at a point located inwardly of the marginal edges thereof to lift and guide the glass into the space between the tools of each pair in proper surfacing position whereby the glass will engage each tool of each pair, and guide means arranged along the path of the glass to align the longitudinal center line of the glass moving along the path with a longitudinal line through the center of one surfacing tool of each aligned pair of tools and to maintain this alignment during the complete passage of the glass between all of the successive pairs of surfacing tools.

8. An apparatus for simultaneously surfacing both sides of flat glass moving along a definite path as defined in claim 7, wherein said supporting means is positioned to engage the glass along the central area thereof.

9. An apparatus for simultaneously surfacing both sides of flat glass moving along a definite path as defined in claim 7, wherein said guide means is positioned to exert a pressure on a side edge of the glass to laterally position and align the glass as it is passed between the surfacing tools.

10. An apparatus for simultaneously surfacing both sides of flat glass moving along a definite path as defined in claim 7, wherein the glass is in the form of a plurality of individual cut blank sheets, and including sheet spacing means to establish positive spacing between successive cut blank sheets as they pass between the surfacing tools.

11. An apparatus for simultaneously surfacing both sides of flat glass moving along a definite path as defined in claim 10, wherein said sheet spacing means includes a spacer member in engagement with the adjacent edges of each two successive cut blank sheets and inserted between each two successive cut blank sheets to space the cut blank sheets sufficiently so that under the influence of the surfacing tools, the adjacent edges of the adjoining sheets will not work against one another.

12. An apparatus for simultaneously surfacing both sides of a plurality of cut blank sheets of glass moving along a definite path toward and between a plurality of aligned pairs of spaced surfacing tools disposed along the path of movement of said sheets, one tool of each pair positioned above the path of the cut blank sheets and one tool of each pair positioned below the path of the cut blank sheets, including aligning means to lead each sheet moving along the path into alignment with the space between the individual tools of each pair, and sheet spacing means adapted to be inserted between each two adjacent sheets and engaging the opposed edges of the adjacent sheets to establish a positive spacing between successive cut blank sheets.

13. An apparatus for simultaneously surfacing both sides of a plurality of cut blank sheets of glass moving along a definite path toward and between a plurality of aligned pairs of spaced surfacing tools disposed along the path of movement of said sheets, one tool of each pair positioned above the path of the cut blank sheets and one tool of each pair positioned below the path of the cut blank sheets, including support means in advance of each pair of tools to engage the lower surface of each sheet moving along said path and to lead said sheet into alignment with the space between the individual tools of each pair, and removable sheet spacing means adapted to be inserted between each two adjacent sheets to establish positive spacing between successive cut blank sheets before said sheets pass between the surfacing tools.

14. An apparatus for simultaneously surfacing both sides of a plurality of cut blank sheets of glass moving along a definite path toward and between a plurality of aligned pairs of spaced surfacing tools disposed along the path of movement of said sheets, one tool of each pair positioned above the path of the cut blank sheets and one tool of each pair positioned below the path of the cut blank sheets, including, in combination, a plurality of first sheet guide means, each of said first guide means being located in advance of each of the pairs of surfacing tools and below the surface of the sheet moving along the path to engage the undersurface of the sheet and to guide said sheet into alignment with the space between each pair of surfacing tools, a plurality of second sheet guide means, each of said second guide means being located adjacent the path of the sheets and engaging the side edges of each sheet to position each sheet laterally with respect to the space between each pair of surfacing tools, and sheet spacing means removably inserted between each two adjacent sheets and engaging the opposed edges of the adjacent sheets to establish a positive spacing between successive cut blank sheets, said sheet spacing means being removed before the sheets are engaged by the surfacing tools.

15. An apparatus for simultaneously surfacing both sides of a plurality of cut blank sheets of glass moving along a definite path as defined in claim 14, wherein said sheet spacing means includes a spacer member inserted between and in engagement with the adjacent edges of each two successive cut blank sheets to space the sheets sufficiently so that under the influence of the surfacing tools the sheets will not work against the adjacent edges of adjacent sheets.

16. In an apparatus for simultaneously surfacing the two flat surfaces of a plurality of cut blank sheets moving along a definite path between a plurality of pairs of substantially aligned spaced rotary surfacing tools disposed along the path of movement of said sheets and operable to simultaneously surface the opposed surfaces of each cut blank sheet, the combination of a plurality of first sheet guide means, each of said first guide means being located in advance of one of the pair of surfacing tools and below the surface of a sheet moving along the path and engaging the undersurface of the sheet to guide each sheet moving along the path into correct surfacing alignment between the pair of surfacing tools, a plurality of second sheet guide means, each of said second guide means being located adjacent the path of the sheets and engaging the side edges of each sheet to guide each sheet moving along the path into correct surfacing alignment between the pair of surfacing tools, and safety means joined to each of said second guide means operable only when a cut blank sheet enters said second guide means out of alignment with the normal path of movement of the cut blank sheets.

17. In an apparatus as defined in claim 16, selectively operable sheet spacing means adapted to establish a desired spacing interval between successive cut blank sheets, said sheet spacing means being operable before the sheets being spaced are surfaced by the rotary surfacing tools.

18. In an apparatus as defined in claim 16, wherein each of said first guide means includes at least one support positioned along the longitudinal centerline of the sheet path adapted to contact a lead edge of each sheet moving along the path to lift the sheet and to guide it into the space beween the opposed surfacing tools.

19. In an apparatus as defined in claim 18, wherein the sheet engaging portion of said support has sloping sides to enable said support to guide the sheet gradually and evenly into position with respect to the surfacing tools.

20. In an apparatus as defined in claim 18, wherein the sheet engaging portion of said support is frustroconical in shape.

21. In an apparatus for simultaneously surfacing the two flat surfaces of a plurality of cut blank sheets moving along a definite path between a plurality of pairs of substantially aligned spaced rotary surfacing tools disposed along the path of movement of said sheets and operable to simultaneously surface the opposed surfaces of each cut blank sheet, the combination of a plurality of first sheet guide means, each of said first guide means being located in advance of one of the pair of surfacing tools and below the surface of a sheet moving along the path and engaging the undersurface of the sheet to guide each sheet moving along the path into correct surfacing alignment between the pair of surfacing tools, a plurality of second sheet guide means, each of said second guide means being located adjacent the path of the sheets and engaging the side edges of each sheet to guide each sheet moving along the path into correct surfacing alignment between the pair of surfacing tools, and safety means joined to each of said second guide means, operable only when a cut blank sheet enters said second guide means out of alignment with the normal path of movement of the cut blank sheets, each of said second guide means including at least two rollers and means for mounting said rollers for free rotation, one on each side of the path of the sheet so that said rollers are in tangential engagement with the opposite edges of a sheet moving along the path to insure that each sheet is in proper longitudinal alignment as it passes between the opposed rotary surfacing tools.

22. In an apparatus as defined in claim 21, wherein said safety means includes a pin forming part of each of said roller mounting means, said pin adapted to be sheared when its respective roller is struck by the lead edge of a cut blank sheet moving along the path out of alignment with said second guide means in which said pin is located.

23. A method of simultaneously surfacing both sides of flat glass moving along a definite path as defined in claim 1, including supporting the glass at a point located in the central area thereof prior to its entry into the space between said opposed surfacing tools and additionally supporting the glass prior to its entry into the space between said opposed surfacing tools at least at two other spaced points, each of said other spaced points being located between the central area of the glass and an edge of the glass.

24. Apparatus for simultaneously surfacing both sides of flat glass moving along a definite path as claimed in claim 7, wherein said support means includes first support means engaging the glass at a point located in the central area thereof and a pair of second support means engaging the glass at least at two other spaced points, each of said second support means being located between the central area of the glass and an edge of the glass.

25. In an apparatus for simultaneously surfacing both sides of a plurality of cut blank sheets of glass moving along a definite path toward and between a plurality of aligned pairs of spaced surfacing tools disposed along the path of movement of said sheets, one tool of each pair being positioned above the path of the cut blank sheets and one tool of each pair being positioned below the path of cut blank sheets, including, in combination, a plurality of rolls extending transversely across said path for supporting and conveying the sheets therealong and between adjacent pairs of surfacing tools, at least one of said rolls being positioned forwardly of the first pair of opposed surfacing tools along said path, with another of said rolls being positioned between each adjacent pair of surfacing tools, point support means located immediately in advance of each pair of tools and between each pair of tools and the roll adjacent and in advance thereof for engaging the lower surface of the glass sheets at a point located inwardly of the marginal edges thereof and lifting and guiding the leading edge of such sheets into the space between the tools of each pair in proper surfacing position, and sheet spacing means to establish a positive spacing between successive cut blank sheets as they pass between the surfacing tools.

26. A method of simultaneously surfacing both sides of a plurality of individual cut blank sheets of glass moving along a definite path toward and between a plurality of aligned pairs of spaced surfacing tools, one tool of each pair being positioned above the path of the cut blank sheets and one tool of each pair being positioned below the path of the cut blank sheets to define a space between the respective tools of each pair, comprising supporting each individual cut blank sheet in advance of each pair of tools by a point support located inwardly of the marginal edges thereof to lift and guide the leading edge of each cut blank sheet into alignment with the space between the individual tools of each pair, establishing a positive spacing between successive cut blank sheets to prevent each cut blank sheet from working against the adjacent edges of adjoining sheets under the action of the surfacing tools as they surface each cut blank sheet and surfacing the glass as it passes through the space between the opposed tools in engagement with both of said tools.

27. A method of simultaneously surfacing both sides of a plurality of individual cut blank sheets of glass moving along a path toward and between a plurality of aligned pairs of surfacing tools, one tool of each pair being positioned above the path of said cut blank sheets and one tool of each pair being positioned below the path of said cut blank sheets to define a space between the respective tools of each pair, comprising positioning and supporting successive cut blank sheets in a definite spaced relation upon spaced lines of transverse support, moving said cut blank sheets at a constant speed in a rectilinear path along said transverse lines of support to maintain said definite spacing between successive cut blank sheets, passing said spaced cut blank sheets between each of said aligned pairs of surfacing tools, with the longitudinal centerline of each cut blank sheet being in alignment with a longitudinal line through the center of at least one of the surfacing tools of each pair, and surfacing the sheet as it passes through said space between the respective tools of each pair in engagement with both of said tools.

28. A method of simultaneously surfacing both sides of a plurality of individual cut blank sheets of glass moving along a path toward and between a plurality of aligned pairs of opposed surfacing tools, one tool of each pair being positioned above the path of said cut blank sheets and one tool of each pair being positioned below the path of said cut blank sheets to define a space between the respective tools of each pair, comprising initially positioning and supporting successive cut blank sheets in a definite spaced relation upon spaced lines of transverse support, moving said cut blank sheets at a constant speed in a rectilinear path along said transverse lines of support to maintain said definite spacing between successive cut blank sheets, aligning said cut blank sheets moving along said rectilinear path so that the longitudinal centerline of each sheet is in alignment with a longitudinal line through the center of at least one of the surfacing tools of each aligned pair of tools, passing said spaced and aligned sheets into the space between each pair of opposed tools, confining each sheet as it moves between the pairs of tools to prevent deviation of the sheets from said rectilinear path and maintain said alignment with each pair of tools, and surfacing the sheets as they pass through the spaces between the opposed tools in engagement with both of said tools.

29. In an apparatus for simultaneously surfacing both sides of a plurality of cut blank sheets of glass moving along a rectilinear path toward and between a plurality of aligned pairs of spaced surfacing tools disposed along the path of movement of said sheets, one tool of each pair being positoned above the path of cut blank sheets and one tool of each pair being positioned below the path of cut blank sheets, the combination comprising a plurality of rolls extending transversely across said path in advance of the first pair of surfacing tools and at least one roll positioned between each adjacent pair of surfacing tools, for supporting and conveying the sheets therealong, means for driving all of said conveyor rolls at a constant predetermined speed to maintain a positive predetermined spacing between successive cut blank sheets moving along said path, and guide means comprising rollers arranged along the path of the glass sheets for engagement with the opposite edges thereof to align the longitudinal centerline of each sheet moving along said path with a longitudinal line through the center of at least one surfacing tool of each aligned pair of tools and to maintain such alignment during the passage of the sheet between successive pairs of surfacing tools, the rollers at each side of said path being spaced from one another a distance less than the length of the cut blank sheets.

30. In an apparatus as claimed in claim 29, in which the means for driving said conveyor rolls positioned forwardly of the first pair of surfacing tools includes an overrunning clutch operatively connected to each of the rolls.

References Cited in the file of this patent
UNITED STATES PATENTS
2,705,854     Laverdisse _____ Apr. 12, 1955